United States Patent
Valko et al.

(10) Patent No.: US 8,526,434 B2
(45) Date of Patent: Sep. 3, 2013

(54) ROUTING MANAGER HIERARCHY

(76) Inventors: Andras Valko, Budapest (HU); Zoltan Turanyi, Szentendra (HU); Csaba Keszei, Budapest (HU); Atsushi Iwasaki, Tokyo (JP); Katsutoshi Nishida, Tokyo (JP)

( * ) Notice: Subject to any disclaimer, the term of this patent is extended or adjusted under 35 U.S.C. 154(b) by 684 days.

(21) Appl. No.: 12/376,923

(22) PCT Filed: Aug. 9, 2006

(86) PCT No.: PCT/JP2006/316074
§ 371 (c)(1),
(2), (4) Date: Aug. 20, 2010

(87) PCT Pub. No.: WO2008/018154
PCT Pub. Date: Feb. 14, 2008

(65) Prior Publication Data
US 2010/0322245 A1   Dec. 23, 2010

(51) Int. Cl.
*H04L 12/56* (2006.01)

(52) U.S. Cl.
USPC .................................................. 370/392

(58) Field of Classification Search
None
See application file for complete search history.

(56) References Cited

U.S. PATENT DOCUMENTS

| | | | |
|---|---|---|---|
| 7,177,295 B1 * | 2/2007 | Sholander et al. | 370/338 |
| 7,307,967 B2 * | 12/2007 | Iwasaki et al. | 370/328 |
| 7,519,025 B2 * | 4/2009 | Hiyama et al. | 370/331 |
| 2005/0201344 A1 * | 9/2005 | Iwasaki et al. | 370/338 |
| 2009/0238193 A1 * | 9/2009 | Nishida et al. | 370/401 |

OTHER PUBLICATIONS

Manhee Jo et al: "Addresses interchange procedure in mobility management architecture for IP-based IMT network platform (IP<2>)" Telecommunications, 2003. ICT 2003. 10th International Conference on Feb. 23-Mar. 1, 2003, Piscataway, NJ, USA, IEEE, vol. 1, Feb. 23, 2003.

* cited by examiner

*Primary Examiner* — Dang Ton
*Assistant Examiner* — Ronald H Davis

(57) ABSTRACT

There are provided a scalable method for mobility management applied to an IP-based network system including a plurality of routers and a plurality of servers, a part of which serve as a home routing manager (HRM), a part of which serve as local routing managers (LRM) for individual mobile nodes. The method at least comprises the steps of sending a first query about a routing address of a destination mobile node toward the HRM, based on an activation notification (AN) from an ingress access router (AR) of the plurality of routers, triggered by a source mobile mode, from an LRM receiving the activation notification; relaying the first query via one or more intermediate routing managers (IRM) closer to the HRM until the first query reaches the HRM; and in response to the first query, sending the routing address of the destination mobile node back to the ingress access router through the relay path from the HRM.

12 Claims, 9 Drawing Sheets

ROUTING MANAGER HIERARCHY

TECHNICAL FIELD

This invention relates to RM (Routing Manager) hierarchy, and more particular to RM hierarchy applicable to an IP-based network system.

BACKGROUND ART

The IP-based IMT network platform (hereinafter referred to as "$IP^2$") is a network architecture that supports terminal mobility with both route optimization and location privacy (see "Address interchange procedure in mobility management architecture for IP-based IMT network platform ($IP^2$)", Manhee Jo, Takatoshi Okagawa, Masahiro Sawada, Masami Yabusaki, 10th International Conference on Telecommunications ICT'2003, Feb. 23, 2003, (hereinafter referred to as reference [1])). The corner stone of $IP^2$ is the separation of the Network Control Platform (NCPF) and the IP-Back Bone (IP-BB). In the $IP^2$ architecture, the NCPF controls the IP-BB. The IP-BB consists of IP routers with additional packet processing features, such as temporary packet buffering or address switching. The NCPF consists of signaling servers that command the IP-BB entities intelligently.

Mobile terminals (or mobile nodes hereinafter referred to as "MN") are assigned permanent terminal identifiers that take the form of an IP address. In addition, MNs are assigned a routing address at the access router (AR) to which it is attached. The routing address is specific to the location of the MN, hence to support location privacy, it shall not be revealed to other MNs. When the MN moves to another AR, a new routing address is allocated to it from the pool of routing addresses available at the new AR. The binding between the MN's terminal identifier (IPha: "IP host address") and its routing address (IPra: "IP routing address") is communicated to the NCPF by the AR. More specifically, the address is sent to the local routing manager (LRM) of the MN that manages the MN's movement in the visited network. The LRM, in turn informs the home routing manager (HRM) of the MN about the IPra.

When a MN (MN1) wishes to send a packet to another MN (MN2), MN1 uses MN2's IPha as destination address in the packet and transmits the packet to its AR (AR1). AR1 (termed as sending AR) detects that the packet is addressed to an IPha of MN2 and queries the NCPF, more specifically the HRM of MN2 about the IPra of MN2. The HRM responds to the queries, and the IPra of MN2 is stored in AR1 along with the IPha of MN2. Then, the destination address of the packet (IPha of MN2) is replaced to the IPra of MN2. This operation is referred to as address switching. The packet is then delivered using traditional IP forwarding to the node that owns the IPra of MN2, that is AR2. AR2 (the receiving AR) then replaces the destination of the packet to the IPha of MN2.

One important function of $IP^2$ is AR notification. Whenever MN2 moves to a new AR, the new AR allocates a new IPra for MN2 and the LRM is notified about this new IPra. Then, the LRM updates the HRM, which, in turn, updates AR1. In fact, the HRM updates all ARs that have MNs that send packets to MN2. That is, when an AR queries the HRM about the IPra for MN1, the HRM stores the identity of the querying AR and when the IPra of MN1 changes the HRM updates all such ARs. We term this behaviour as the AR being subscribed for updates of a particular $IP^2$ terminal identifier. Each query the AR makes about an $IP^2$ terminal identifier at the HRM results in the AR being subscribed at the given HRM for the given $IP^2$ terminal identifier.

To decrease the frequency of such updates, the LRM may configure an anchor router (ANR) in the visited network of MN2. The ANR also allocates a routing address for MN1 that is then used by the LRM to update the HRM. Thus, the IPra allocated by the ANR for MN2 is used by AR1 when MN1 sends packets to MN2. When these packets arrive at the ANR, it replaces the destination address to the IPra allocated by AR2 for MN2. Then, the packet is delivered further from the ANR to AR2 using traditional IP forwarding. AR2 switches the destination address back to the IPha of MN2 and delivers the packet to MN2 as without the ANR. Whenever a handoff occurs, the LRM notifies the ANR of the new IPra allocated by the new AR for the MN. In contrast, the HRM is not notified because the IPra allocated by the ANR does not change. Hence, ARs that have MNs transmitting to MN2 also need not be notified at handovers. The HRM (and consequently the ARs) is updated only when the ANR changes. This can happen intentionally due to path optimization or load balancing, or unintentionally when the current ANR fails and another is selected. The use of anchor routers is also defined in "Address interchange procedure in mobility management architecture for IP-based IMT network platform (IP2)" mentioned above.

In addition to destination address switching, the source address of packets can be switched as well. In this case, when MN1 sends a packet to MN2, the AR2 switches the destination address to the IPra of MN2 and the source address to the IPra of MN1. Then, the packet is delivered to AR2 (possibly via an ANR) using IP routing. The AR2 replaces the destination address (IPra of MN2) to the IPha of MN2 and queries the NCPF for the IPha of MN1 based on the source address, that is the IPra of MN1 at this point. The NCPF responds to the queries and AR2 replaces the source address with the IPha of MN1 and then forwards the packet (that is now identical to the original one) to MN2. Source address switching is specified in "Experimental Evaluations of Feasibility and Bottlenecks of IP2 Mobility Management", Shinta Suigimoto, Masayuki Ariyoshi, Csaba Keszei, Zoltan Turanyi, Andras Valko, Yoshinori Hayashi, Katsutoshi Nishida, Shin-ichi Isobe, Atsushi Iwasaki, IEEE International Conference on Communications (ICC2005), May 16, 2005.

Another option to transmit packets between the ARs is standard IP tunnelling. In this case, the, sending AR (AR1 in our example) does not replace the destination (and source) address of the packet, but encapsulates the packet in a tunnel. The endpoint of the tunnel is the IPra of the destination MN (MN2 in this example). The destination AR (AR2), then, needs only to decapsulate the incoming packets and can transmit them to MN2 right away. We note that, in this case, AR2 does not need to allocate a separate IPra for each MN that is attached to it, but can reuse its own address multiple times.

As summarized, there are three options in transmitting packets from an MN to another MN: (1) destination-only address switching; (2) source+destination address switching; and (3) IP tunneling.

The basic problems for which this invention provides a solution are: how do sending ARs locate the HRM of a destination MN based on the MN's IPha?; and how do such ARs detect if the IPha of the destination MN is in fact a terminal identifier and not a regular IP address.

This is termed as problem #1 in this document and is relevant for all three "transport options" (IP tunneling, destination-only address switching and source+destination address switching).

Problem #2 arises only in case of source+destination address switching. In this case, receiving ARs need to query the IPha of the sending MN based on the IPra of the sending MN. How does receiving ARs identify the relevant NCPF entity to query that might know the binding?.

Since $IP^2$ is a very recent development, no solutions are published to the problems mentioned above.

However, there are some obvious conventional approaches.

For Solving Problem #1:

1. The most obvious solution is to use a single HRM for all MNs. If the queried IPha is not an $IP^2$ terminal identifier then the HRM responds with an error.

2. Another option would be to employ multiple HRMs that are each responsible for a set of MNs. Each HRM advertises the IPha of all of its MNs into the Internet's routing fabric. In this case, the HRM has the IPha of the MN itself. If each HRM advertises the block of terminal identifiers into the Internet's routing fabric, then any packet sent in the Internet having one of the terminal identifiers as IP destination address will arrive at the HRM owning (and advertising) that terminal identifier. Therefore, sending a query using the terminal identifier as IP destination address, will reach the HRM, which, in turn, can respond. On the other hand, however, if there is no HRM at the address, there will be no reply to such a query, except may be for an ICMP Destination Unreachable message. If this is the case, the sender of the query can deduce that "there is no HRM at the IPha (and no answer arrives for the query)". Then, the querying AR concludes that the IPha is not an $IP^2$ terminal identifier."

3. A third option would be to use reverse DNS (Domain Network System) to store HRM addresses. If the DNS contains no information under the reverse name corresponding to the IPha, then the querying AR might conclude that the IPha is not an $IP^2$ terminal identifier.

For Solving Problem #2:

These options can partially be applied to problem #2, as well.

1. The use of a single HRM also solves problem #2.

2. The receiving AR that owns the IPra of the destination MN can respond with the IPha of the destination MN. In this case, a specially formatted IP packet addressed to the IPra can be used as query.

3. The DNS can also be used to store IPha addresses.

There are several problems with the above naive approaches.

Limiting the number of HRMs imposes scalability limits on the system, especially if the number of HRMs is at most one.

Using the second approach to solve problem #1 limits the use of $IP^2$ terminal identifiers as routable IP addresses. This limits network design, as the use of $IP^2$ terminal identifiers as IP addresses is necessary when $IP^2$ MNs communicate with non $IP^2$ correspondent nodes (CNs). When such CNs send packets to $IP^2$ MNs, those packets are routed in the legacy Internet based on the MN's IPha in the destination address. When using the second approach for problem #1, packets addressed to the IPha of a MN are routed to its HRM. This forces the HRM to cope with both queries and packets sent by CNs to the MN. This is a clear violation of the separation of NPCF and IP-BB and is highly impractical.

Using the second approach to solve problem #2 results in the use of "specially formatted" IP packets. This either means a specific IPv6 option or some form of protocol/port number combinations. The AR shall test all packets before address switching if they are "specially formatted". Security is essential in this context, since IPha-IPra mappings reveal location information. It is very hard to secure the query process because each AR (or ANR) must be able to validate if the querying entity is entitled to know the IPha of the MN. Besides the scalability problems of trust management, this approach also violates the NCPF-IP-BB principle, as access shall be controlled by the NCPF and not a router in the IP-BB.

The third approach (using reverse DNS) is problematic, because it overloads the DNS. Any attack on the DNS (e.g., on the root servers) might make IP level communication impossible. In addition, the DNS suffers significant performance problems that are somewhat out of the control of the operator. Finally, in case of problem #2, the DNS need to be quickly updated when a new IPra is allocated. This is also not conforming to the design of the DNS.

SUMMARY OF THE INVENTION

Accordingly, the present invention is conceived as a response to the above-described disadvantages of the conventional art.

In this invention, we, therefore, propose a hierarchy of servers to solve the above-mentioned problem. The solution also provides opportunities for extensions of $IP^2$ beyond the problems mentioned in above.

According to one aspect of the present invention, preferably, there is provided a method for mobility management used in an IP-based network system (1) including a plurality of routers and a plurality of servers, a part of which serve as a home routing manager (HRM), a part of which serve as local routing managers (LRM) for individual mobile nodes, comprising the steps of: sending a first query about a routing address of a destination mobile node toward the HRM, based on an activation notification (AN) from an ingress access router (AR) of the plurality of routers, triggered by a source mobile mode, from an LRM receiving the activation notification; relaying the first query via one or more intermediate routing managers (IRM) closer to the HRM until the first query reaches the HRM; and in response to the first query, sending the routing address of the destination mobile node back to the ingress access router through the relay path from the HRM.

It is preferable that the method further comprises the steps of: sending a second query about a home address of the source mobile node to an LRM which performs mobility management on an egress access router (AR) having the routing address; relaying the second query via one or more intermediate routing managers (IRM) until the second query reaches the LRM advertising a routing address of the ingress access router; and in response to the second query, sending the home address of the source mobile node back to the egress access router through the relay path from the LRM advertising the routing address of the ingress access router.

In the above system to which the method is applied, it goes without saying that the source mobile node sends an activation signal (ACT) to the ingress AR, and the ingress AR sends an activation notification (AN), based on the activation signal.

Further, the method may preferably comprises the steps of: discriminating whether or not each IRM has more than one path toward the HRM; selecting a path closer to the HRM, based on the discrimination result; and relaying the first query using the selected path.

Furthermore, the method may preferably comprises the step of providing a first database containing information on one or more adjacent routing managers closer to the HRM with each of the IRMs and LRMs. In this case, the relay of the first query may be performed based on the information contained in the first database.

Also, in sending the routing address of the destination mobile node back to the ingress access router, the method may further comprises the step of selecting a path nearer toward the LRM receiving the activation notification, based on the information contained in the first database, and may perform such sending back through the selected path.

When updating the routing address of the destination node, the method may perform such update through the selected path.

When the source mobile node moves away from the ingress access router, the method may preferably further comprises the, steps of: sending another activation signal (ACT) to a new ingress access router from the source mobile node; sending a activation notification (AN) from the new ingress access router, based on the activation signal; sending a third query about the routing address of the destination mobile node, based on the activation notification (AN) from an LRM receiving the activation notification; relaying the third query via one or more intermediate routing managers (IRM) closer to the HRM until the third query reaches a first routing manager which knows about the routing address of the destination mobile node; and in response to the third query, sending the routing address of the destination mobile node back to the new ingress access router through the relay path from the first routing manager.

When obtaining the home address of the source mobile node, the method may preferably further comprises the step of providing a second database containing information on routing managers toward the LRM advertising the routing address of the ingress access router with each of the routing managers. In this case, the relay of the second query may be performed based on the information contained in the second database.

In the above system to which the method is applied, a server serving as the LRM receiving the activation notification and a server serving as at least one of the IRMs should be situated adjacent to each other, and at least some of the plurality of routers preferably function as access routers, each capable of wirelessly communicating with a mobile node.

According to another aspect of the present invention, preferably, there is provided an IP-based network system including a plurality of routers and a plurality of servers, a part of which serve as a home routing manager (HRM), a part of which serve as local routing managers (LRMs) for individual mobile nodes, wherein each of the LRMs comprises: means for sending a first query about a routing address of a destination mobile node toward the HRM, based on an activation notification (AN) from an ingress access router (AR) of the plurality of routers, triggered by a source mobile mode, and the HRM comprises means for sending the routing address of the destination mobile node back to the ingress access router, in response to the first query, characterized in that at least one of servers serves as an intermediate routing manager, the intermediate routing manager comprises: means for relaying the first query toward the HRM; and means for relaying the routing address of the destination mode toward the ingress access router.

Note that the intermediate routing manager preferably comprises: means for relaying a second query about a home address of the source mobile node toward the LRM advertising a routing address of the ingress access router; and means for relaying the home address of the source mobile node, as a response to the second query, originated from the LRM advertising the routing address of the ingress access router toward the egress access router.

According to still another aspect of the present invention, preferably, there is provided a server used in an IP-based network system comprising: means for relaying a query about a routing address of a destination mobile node originated from an activation notification (AN) from an ingress access router in the network system toward a home routing manager (HRM); and means for relaying the routing address of the destination mode toward the ingress access router as a response to the query.

Preferably, the server further comprises: means for relaying a second query about a home address of a source mobile node toward a local routing manager (LRM) advertising a routing address of the ingress access router; and means for relaying the home address of the source mobile node, as a response to the second query, originated from the LRM toward an egress access router.

A method for mobility management according to this invention is scalable for querying and distributing $IP^2$ terminal identifier to routing address mappings. The invention is therefore advantageous since this method is effectively applicable to a small-scale network system to a large-scale network system.

In addition, reverse mappings can also be distributed, albeit in a less efficient fashion.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

A preferred embodiment of the present invention will now be described in detail in accordance with the accompanying drawings.

In, this embodiment, a query-response process for IPra notification of a destination mobile node (MN) will be first described.

Figure 1:
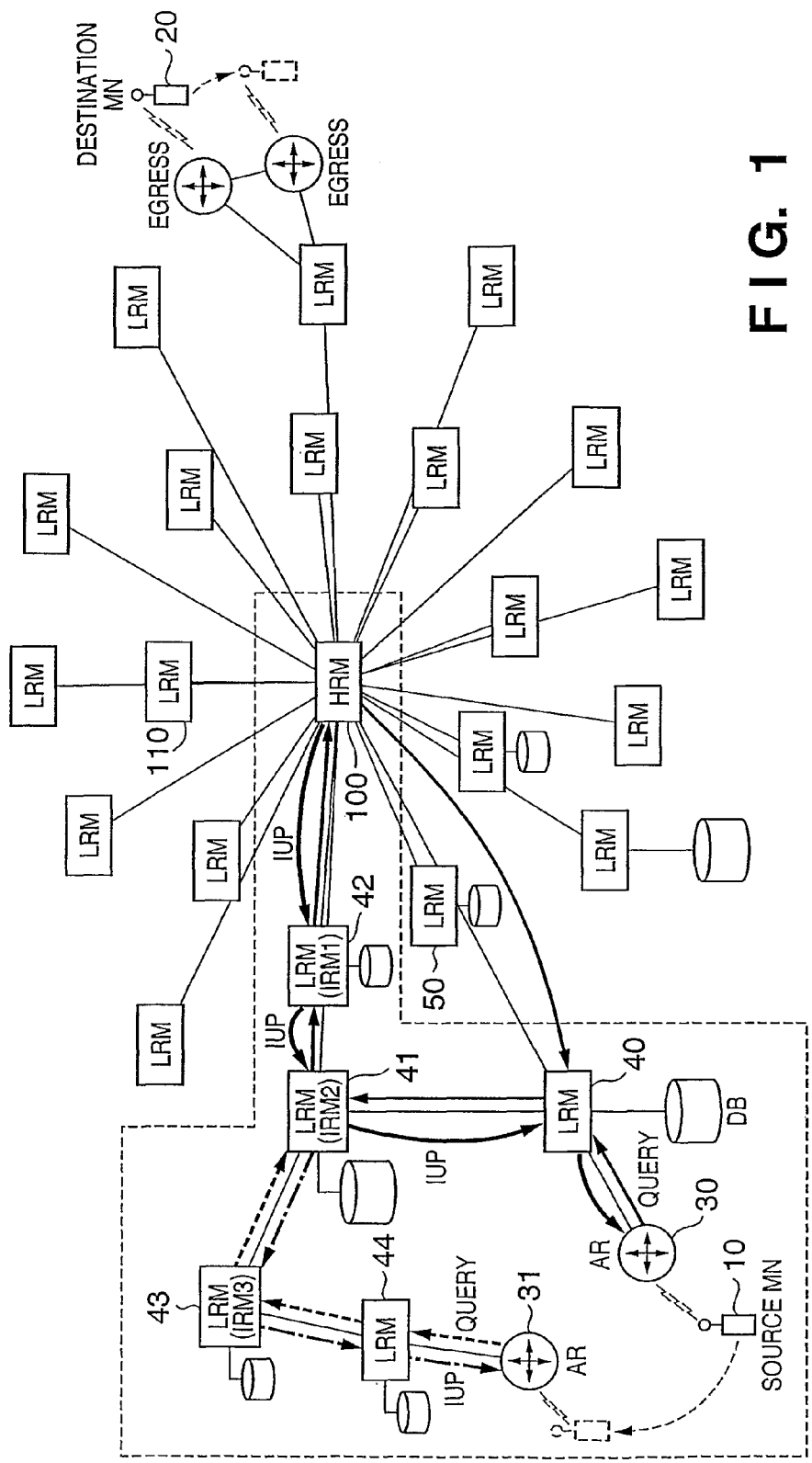
FIG. 1 is a diagram showing query-response for IPra notification in an IP-based network system according to an embodiment of the present invention.

FIG. 1 is a diagram showing query-response for IPra notification in an IP-based network system according to an embodiment of the present invention. This system basically consists of a plurality of servers, a plurality of routers, and a plurality of mobile nodes (MNs). In the IP-based network system, the servers are responsible for not only mobility management but also QoS/Session control, AAA (Authentication Authorization and Accounting), Wireless Management Coordination etc.

However, since this application focuses on mobility management, other functions as stated above is not described any further.

Mobility management is divided into location management for dormant MN and routing management for active MN. As apparent from the background of invention, this present invention handles routing management. Thus, in the following description, we assume that the servers are dealt as routing managers (RMs).

As discussed above, the routing manager (RMs) are usually divided into Home Routing Managers (HRMs) for managing a home to which a user subscribes and governing the source MN, and Local Routing Managers (LRMs) for locally governing the destination MN's movement in a visited area of the network.

Note that each operator, that has mobile subscribers, own a block of the $IP^2$ terminal identifier space. Such operators set up one or more HRMs, each of which is responsible for a subset of the mobile subscribers. (Redundancy is possible by assigning more than one HRM to a mobile subscriber. This is not explored further in this document.) HRMs store the current routing address of the MN. Access networks that accept visiting $IP^2$ mobile subscribers maintain one or more LRMs to handle local mobility as described in reference [1].

However, for the simplicity of explanation, the network system shown in FIG. 1 includes a plurality of LRMs and a single HRM.

In the IP-based network system, in order for a source MN 10 to send packets to a destination MN 20, an ingress access router (AR) 30 must know the routing address (IPra) of the destination MN 20.

Conventionally, when receiving an activation signal (ACT), an LRM 40, for example, sends a query to a HRM 100 to obtain the routing address from the HRM 100.

In this embodiment according to the present invention, the network system employs additional routing managers, called "Intermediate Routing Managers (IRMs)". In an example of FIG. 1, from the view of the source MN 10, the LRMs 41, 42 and 43 act as the IRMs. Each IRM is actually a server, and it may act as an LRM depending on where a source MN is located. Administrators configure adjacency relations between some LRMs, IRMs and HRMs. HRMs advertise the block of $IP^2$ terminal identifier, and they are is responsible for to their neighbours using a custom protocol. The neighbouring RMs (may be LRMs, IRMs or other HRMs), in turn, advertise these blocks further. The protocol that is used to advertise blocks of addresses can be designed along the lines of existing routing protocols, with adjacency relations as links and RMs as routers. For example, the design of Routing Information Protocol version 2 [G. Malkin, "RIP version 2", IETF RFC 2453, STD 56, November 1998] or Border Gateway Protocol 4+ [Y. Rekhter, and T. Li, "A Broader Gateway Protocol (BGP-4)", IETF RFC 1771, March 1995] may serve as excellent examples. As a result of the advertisements, each RM knows at least the set of valid $IP^2$ terminal identifiers. In addition the advertisements may carry more information (see later).

When an access router (AR) is interested in the routing address for a destination mobile node, it sends its query to the one of the LRMs of the access network the AR belongs to.

Depending on which LRM first receives the query from the AR, a routing path to the HRM may vary. In addition, there are some options in a responding path from the HRM.

Option #1:

The advertisements may carry the identity of the HRM that owns the particular block of $IP^2$ terminal identifiers. Based on this information the LRM may respond with the HRM address to the sender AR making the query. For example, if an LRM 110 which is situated closed to the HRM as shown in FIG. 1, the LRM 110 first receives the query from the AR, and the LRM 110 receives such advertisements, the LRM 110 is able to send a response to the AR. Then, the AR is able to query the HRM about the routing address of the destination mobile node. If the AR does so, the HRM adds the AR to the list of subscribed ARs for that particular $IP^2$ terminal address. When the corresponding routing address changes the HRM will send updates.

Figure 2A:
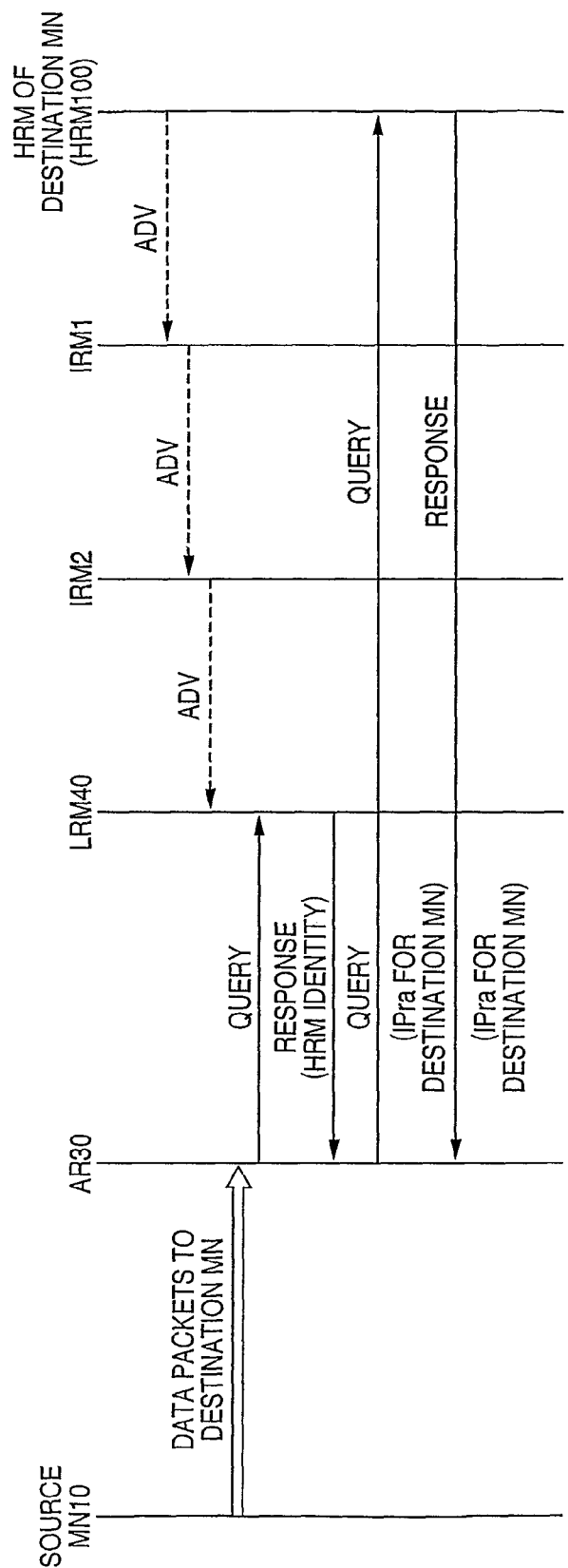
FIG. 2A is a communication sequence for notifying IPra of a destination MN of a source access router.

FIG. 2A shows a communication sequence for notifying IPra of a destination MN of a source access router.

Particularly, FIG. 2A shows a communication sequence in a case where an LRM is situated away from an HRM. One example of this case is the relationship between the HRM 100 and the LRM 40 which is situated away from the HRM 100, as shown in FIG. 1. More specifically, the LRM 40 receives an advertisement (ADV) from the HRM 100 via the IRM 1 and the IRM 2, and sends a response including the identity (address) of the HRM 100 to an AR 30. Then, the AR 30 sends a query about the IPra for the destination MN directly to the HRM 100. In response to the query, the HRM 100 respond to the AR 30 with the IPra for destination MN.

Option #2:

Each RM (HRM, IRM, LRM) maintains a "routing database" for storing the advertisements. For each $IP^2$ terminal identifier, the database contains an adjacent RM (LRM, IRM) that is "closer" to the HRM responsible for the $IP^2$ terminal identifier. For example, in a case where the LRM 40 which is situated away from the HRM 100 receives a query about the routing address of the destination MN 20 from the AR 30, the LRM 40 may forward the query to the LRM 41. The query then passes through a chain of RMs (e.g. LRM 40, LRM 41, LRM 42) toward the HRM 100. In this case, the LRMs 41 and 42 act as IRMs. The HRM 100 responds with the routing address of the MN 20 in question to the sending AR 30 requesting the routing address. In addition, the HRM 100 adds the AR to the list of subscribed ARs for the particular $IP^2$ terminal address. When the corresponding routing address changes, the HRM 100 will send updates.

As a variation, when the LRMs and IRMs know more of the path toward the HRM 100 than the next hop only, if they know, e.g., the second next hop as well, they may skip the next hop and forward the query directly to the second next hop. For example, if the LRM 40 knows about the identity of the LRM 42 or an LRM 50, the LRM may skip the LRM 41 or may send the query to the LRM 50.

In the extreme case, the LRMs may know the full path toward the HRM 100 and send the query to the HRM directly. This is in effect the same as Option #1.

Figure 2B:
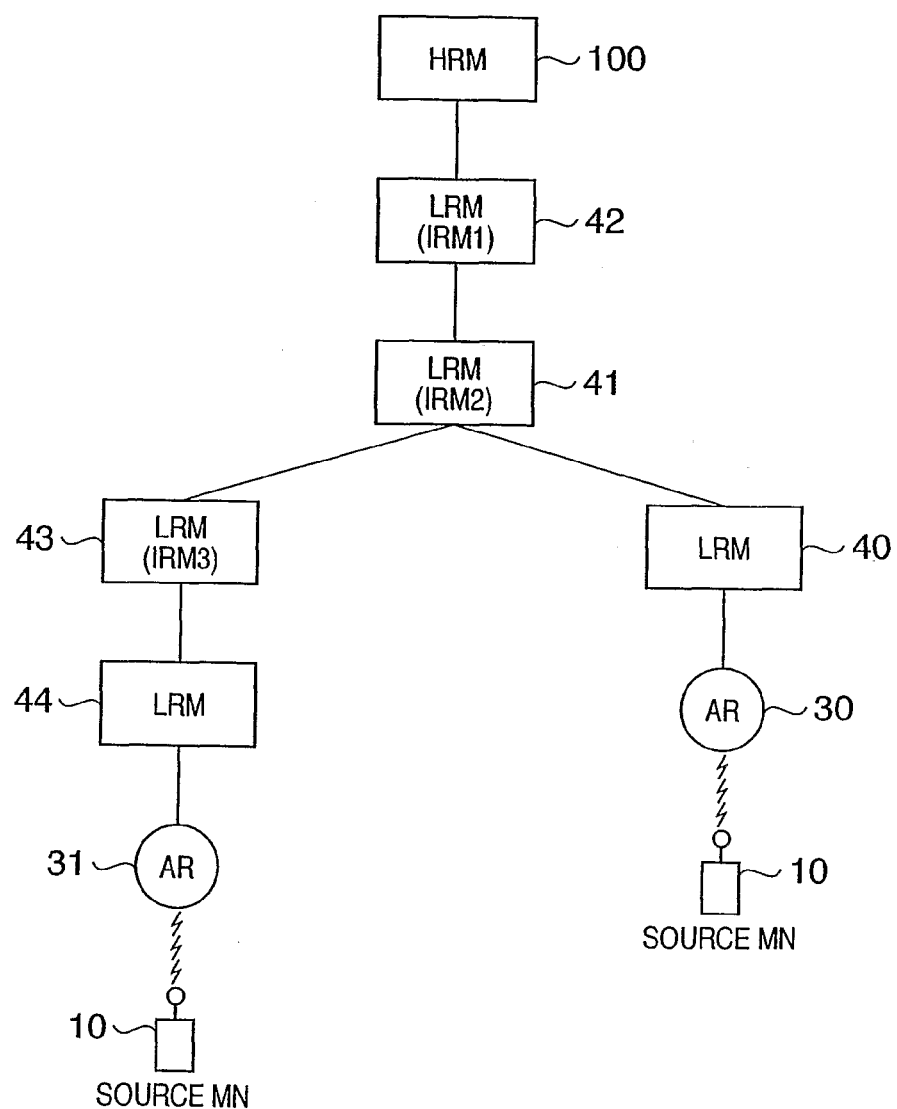
FIG. 2B is a diagram showing an example of topology for routing manager.

Option #3:

FIG. 2B is a diagram showing an example of topology for routing manager. This topological tree is derived from the relationship between HRM 100, LRMs 40-44, ARs 30 and 31, and the source MN shown in FIG. 1. The HRM 100 is a root of the tree, the LRMs 40 and 44 associated with the ARs 30 and 31 are leaves.

Figure 2C:
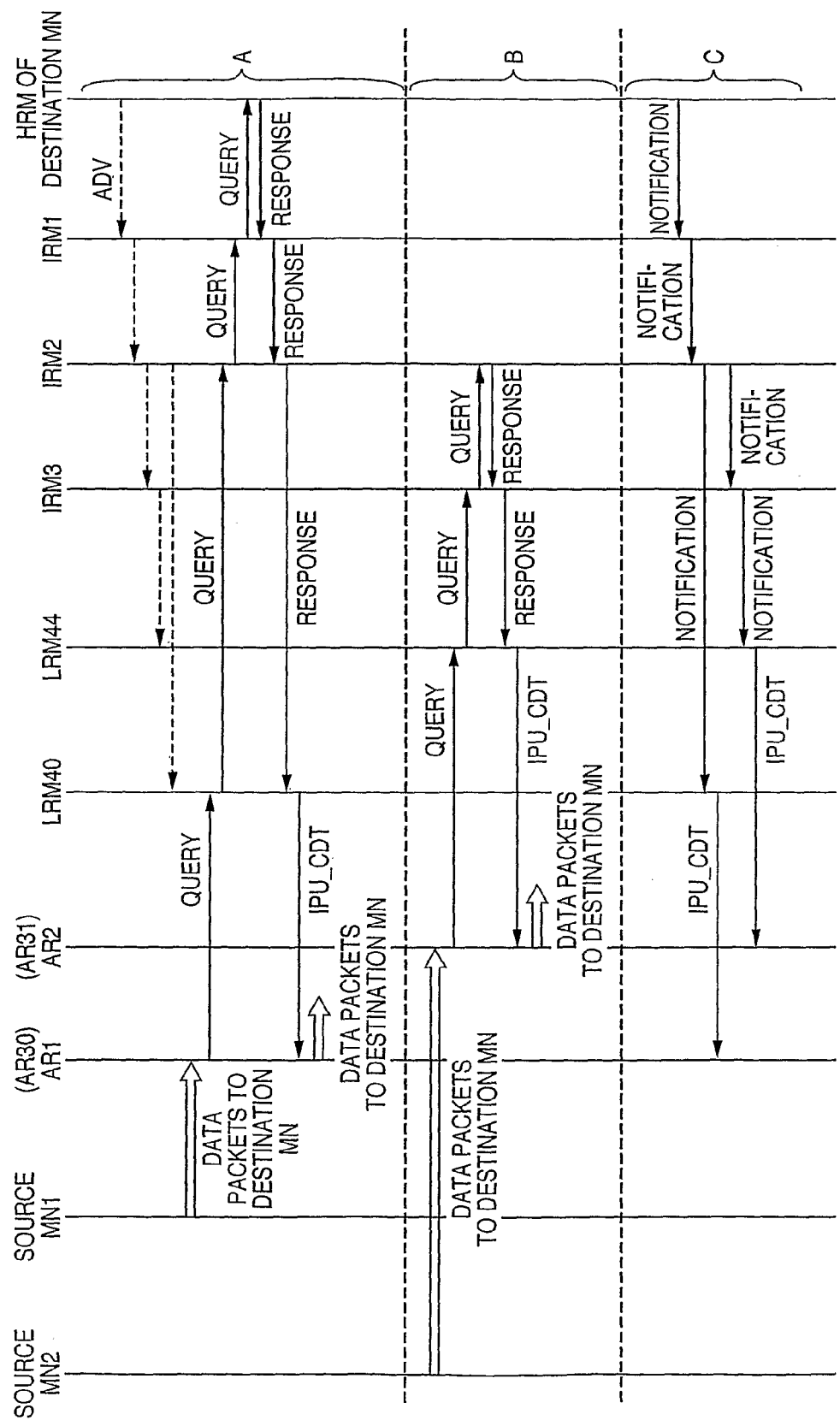
FIG. 2C is another communication sequence for notifying IPra of a destination MN of a source access router.

FIG. 2C shows a communication sequence in a case where an LRM is situated away from an HRM.

After the query has passed through the chain of RMs (LRM and IRMs) and has reached the HRM as in Option #2, the HRM may send its response to the last RM in the chain instead of the sending AR, which originated the query. In this way, the response, that contains the routing address propagates backward in the chain of RMs, reaches the LRM, and is finally passed back to, the originating AR.

In this case, the HRM does not add the originating AR to its subscription list for the $IP^2$ terminal identifier in question. Instead, it adds the last RM (IRM or LRM) in the chain it has sent the response to. That RM (IRM or LRM), in turn, adds the previous RM to its own subscription list for the $IP^2$ terminal identifier and so do all of the RMs in the chain. Finally, the LRM adds the originating AR to its own subscription list.

In an example of FIG. 1, the HRM 100 sends a response to the LRM 42 which acts as an IRM, the LRM 42 sends (relays) the response to the LRM 41 which acts as another IRM, and the LRM 41 sends (relays) the response to the LRM 40. Finally, the LRM sends the response to the ingress AR 30.

Particularly, an upper portion (A) of FIG. 2C summarizes such communication sequence between the ingress AR (AR1) and the HRM. In FIG. 2, IPU_CDT denotes an IP update for Cache for Destination Terminal.

When the routing address changes, the HRM will notify the previous RM that, in turn, will notify its own previous RM according to its subscription list. The update propagates back toward the sending AR and each RM is updated during the process.

When another AR (e.g. AR2 in FIG. 2C) associated with a source MN is interested in the routing, address for the same $IP^2$ terminal identifier, it also starts a query toward the HRM. This may be either (1) a case where another MN sends packets to the same destination MN or (2) a case, where the source MN 10 moves from the AR 30 to the AR 31, and the AR 31 sends a query to the LRM 44, as shown in FIG. 1. In the latter case, handover takes place.

According to the topological tree shown in FIG. 2B, the LRM 41 which acts as an IRM is a branching point. One branch is extended to the LRM 40, while the other branch is extended to the LRM 43. Such a routing manager located at the branching point is sometimes referred to as an RMcross. The LRM 41 which acts as an RMcross must have had already known about the routing address as one of the IRMs, when the AR 30 has sent the query towards the HRM 100 and it sends back the response through the IRMs.

In this case, the query from the LRM will not necessarily reach the HRM. When it reaches an RM (RMcross) that already knows the routing address (and is on the subscription list of an RM closer to the HRM), that RM (RMcross) will respond and extend its subscription list with the RM it has received the query from. The response will propagate back toward the newly interested AR with the subscriptions established along the chain.

In an example of FIG. 1, the LRM 44 sends the query to the LRM 43, the LRM 43, in turn, sends the query to the LRM 41, then the LRM 41 returns the response to the LRM 44. The LRM 44 sends a response (IPU_CDT) to the AR 31.

This communication sequence is summarized as shown in a middle portion (B) of FIG. 2C. Note that the middle portion merely shows a case where another source MN (source MN 2) sends packets to the same destination MN.

When the destination source MN 20 moves from the current AR to a new AR as shown in FIG. 1, the routing address for the same $IP^2$ terminal identifier changes. Then, the HRM is notified of the new routing address.

Then, in accordance with the topological tree shown in FIG. 2, the HRM 100 sends the notification to the LRM 42 (IRM1), it in turn sends the notification to the LRM 41 (IRM2), it in turn sends the notification to the LRM 40, and it sends IPU_CDT to the AR30. Also, the LRM 41 (IRM2) sends the notification to the LRM 43 (IRM3), it in turn sends the notification to the LRM 44, and it sends IPU_CDT to the AR31. This communication sequence is summarized as shown in a lower portion (C) of FIG. 2C.

When the routing address changes again, the HRM will update the RM (LRM or IRM) on its subscription list and the update will reach an RMcross. For example, when handover at the destination MN side takes place, the HRM sends only one notification along the tree as shown in FIG. 2B. Once such a notification reaches the branching point, the RMcross duplicates the message. The RMcross will update both RMs on its subscription list and the update will reach both interested ARs (e.g. ARs 30 and 31 in FIG. 2B). In short, the network of RMs operate as a cache hierarchy by caching the routing addresses for $IP^2$ terminal identifiers. The caches are refreshed forcefully during the subscription time. This ensures that all caches (RMs) has up-to-date information.

Figure 3:
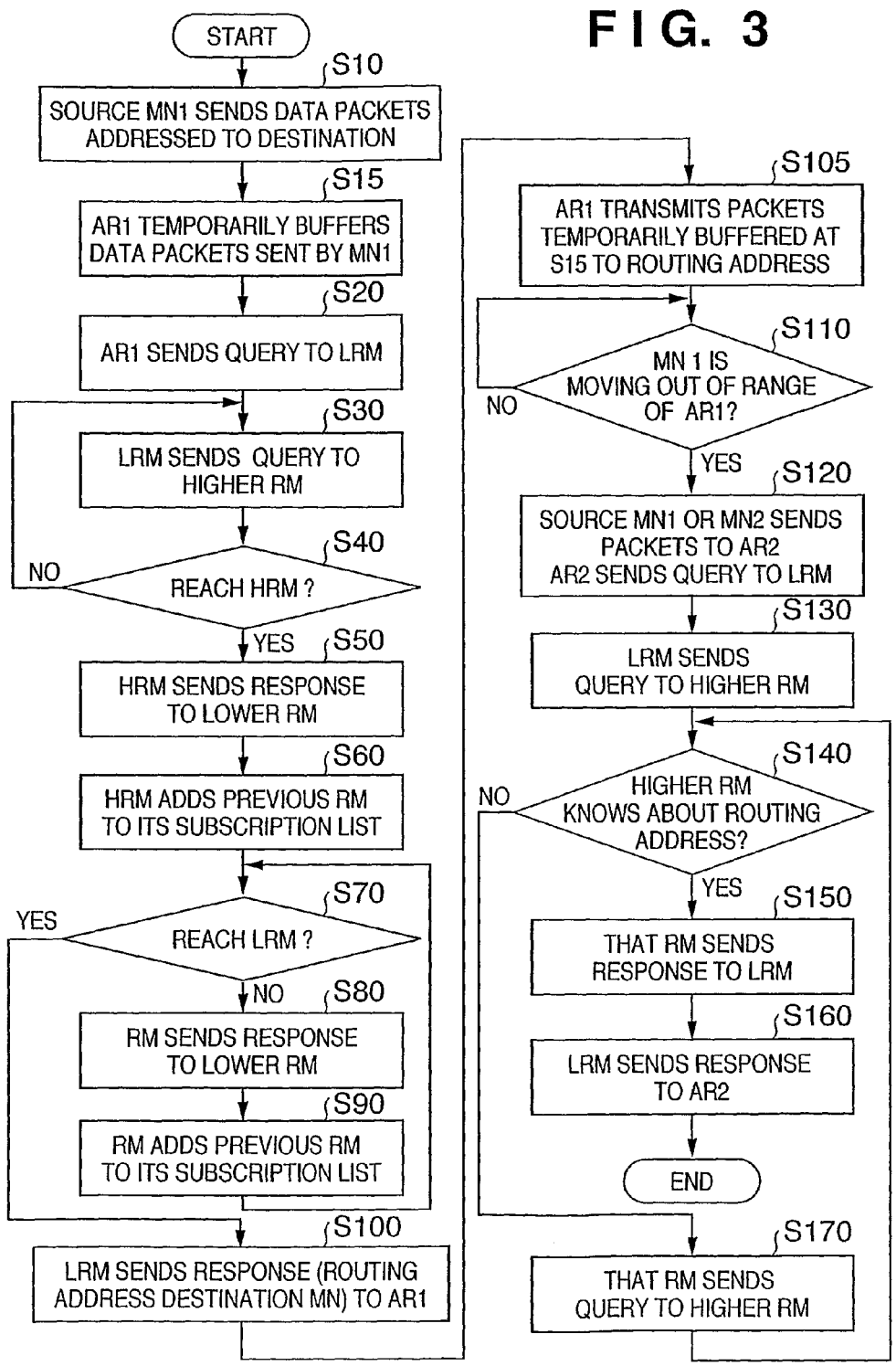
FIG. 3 is a flowchart showing the process of IPra notification.

Part of the process in Option #1 and #3 may be summarized in a flowchart of FIG. 3.

At step S10, a source MN operable in an IP-Based network system having hierarchical-structured RMs sends data packets to a destination MN via an access router (AR1). The AR1 temporarily buffers the data packets sent by the MN1 at step S15. In response to an ACT, at step S20, the AR1 sends a query to an LRM. At step S30, the LRM sends (relays) a query to higher RM (IRM or HRM).

Next, it is determined at step S40 whether or not the query reaches an HRM. If "yes", the process proceeds to step S50. If "no", the process returns to step S30.

At step S50, the HRM sends a response (including a routing address of the destination MN) to a lower RM (IRM or LRM), and at step S60, the HRM adds that RM (IRM or LRM) to its subscription list.

It is determined at step S70 whether or not the response reaches the LRM. If "yes", the process proceeds to step S100. If "no", the process proceeds to step S80. At step S80, that RM sends (relays) the response to a further lower RM, and step S90, the RM adds a previous RM to its subscription list. After this, the process returns to step S70.

At step S100, the LRM sends the routing address of the destination MN to the AR1. The AR1, then, transmits the packets temporarily buffered at step S15 to the routing address.

At step S110, it is discriminated whether the source MN is moving out of a range of the AR1. If not, such monitoring is continued. However, if it is discriminated that the source MN is moving from the AR1, the process proceeds to step S120. At step S120, the source MN (MN1 or MN2) sends packets to another AR (AR2), and then AR2 sends a query to an LRM associated with the AR2. In response to the query, at step S130, the LRM sends a query to a higher RM.

Next, it is determined at step S140 whether or not that RM knows about the routing address of the destination MN. If "yes", the process proceeds to step S150 to send a response to the LRM. Then, at step S160, the LRM, sends the response to the AR2.

On the other hand, if the RM does not know about the routing address of the destination MN, the process proceeds to step S170 to further send the query to a higher RM until the query reaches the RM knowing about the routing address of the destination MN.

Option #4:

This is a slight modification of Option #3 where various RMs of the "routing tree" may be left out, of the "subscription tree".

The term "routing tree" is defined as follows. In the above-mentioned topological tree shown in FIG. 2, the AR 30 which receives packets from the source MN sends an query. In this case, according to Option #3, the LRM 40, the LRM 41

(IRM2), and the LRM 42 (IRM1) relay the query to the HRM. This relay path (LRM→IRM2→IRM1→HRM) is referred as "routing tree". Likewise, in a case where the AR 31 which receives packets from the source MN sends an query, according to Option #3, the LRM 44, the LRM 43 (IRM3), the LRM 41 (IRM2), and the LRM 42 (IRM1) relay the query to the HRM. This relay path (LRM→IRM3→IRM2→IRM1→HRM) is also referred as "routing tree". The response path from the HRM is HRM→IRM 1→IRM2→IRM3→LRM.

However, there is a case where the above "routing tree" can be cut short. This case is Option #4.

First, similar to Option #2, if the RMs know more of the path toward the HRM of the particular $IP^2$ terminal identifier than the next hop only, they may skip some of the RMs in the path and send the query directly to an RM more ahead. Assume that the path toward the HRM is LRM, IRM3, IRM2, IRM1, and HRM. If IRM3 knows that IRM1 is the second next hop, it may skip IRM2. Naturally, IRM1 will add IRM3 to its subscription list, thus when the reply comes, the IRM1 will update IRM3 and skip IRM2.

Second, even though the query is forwarded through all RMs (LRM, IRMs and HRM) of the path, the response may skip some. Assume, for example, that the IRMs know only the next hop of the path. Then (using the example above), the query may traverse IRM1-3. If these IRMs store their identity in the query (in a fashion similar to IPv4's route record option), then the responding IRMs may skip some of the IRMs from the path of the response. For example, even though IRM1 has received the query from IRM2, it may still subscribe IRM3 and send the query to it.

This may come true, for example, in the following condition.

Assume that the routing tree toward the HRM is LRM, IRM3, IRM2, IRM1, and HRM as shown in FIG. 2B, and a query has a field named to "RM to notify" which is set to the sending RM by default. More specifically, in the above assumption it is set to "LRM" in the query between LRM and IRM3, to "IRM3" in the query between IRM3 and IRM2, to "IRM2" in the query between IRM2 and IRM1, and "IRM1" in the query between IRM1 and HRM. However, there is a case where one of the IRMs has already known about what a higher RM is in connection with the particular $IP^2$ terminal identifier. For example, as apparent from FIG. 1 and FIG. 2B, the IRM2 (LRM 41) has already known about the routing tree towards the HRM of the destination MN. In such a case, the IRM2 may determines that "RM to notify" in the query to the IRM1 is set to not "IRM2" but "IRM3". Then, the IRM1 add "IRM3 (not IRM2)" to its subscription list.

In this case, a response path from the HRM becomes HRM→IRM 1→IRM3→LRM. In the other words, the response skips the IRM2. This response path based on the subscription list as above is referred to as "subscription tree".

These allow the updates to travel faster as the "subscription tree" is shorter than the "routing tree".

Note that the routing address that is returned in any of the above options may be allocated by an AR or the ANR (or any other node that perform destination address switching or serve as a tunnel endpoint).

Next, a query-response process for IPha notification of a source mobile node (MN) will be described.

Figure 4:
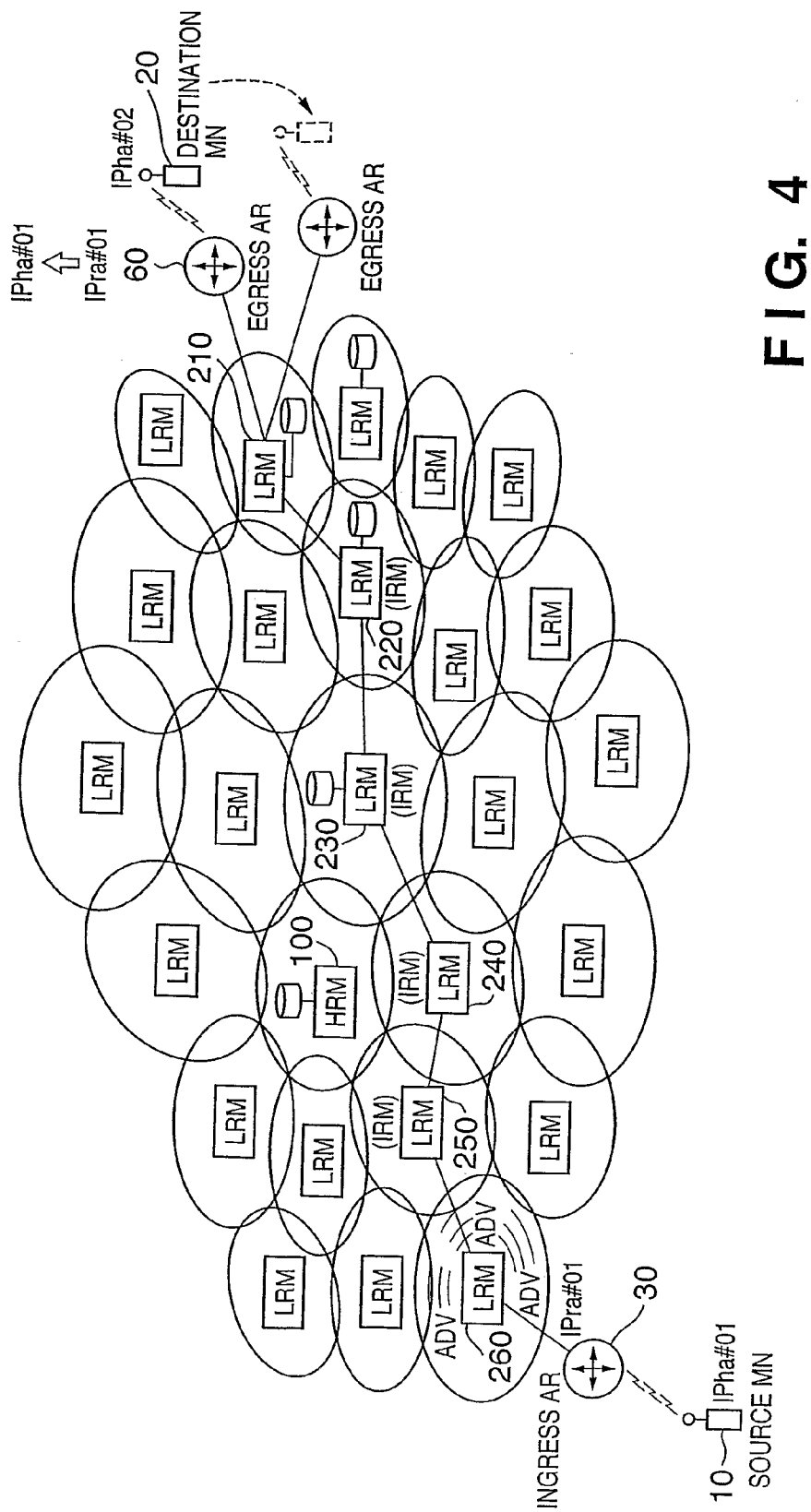
FIG. 4 is a diagram showing query-response for IPha notification in an IP-based network system according to an embodiment of the present invention.

Similar to FIG. 1, FIG. 4 is a diagram showing an initial query-response in an IP-based network system according to an embodiment of the present invention.

As shown in FIG. 4, a destination AR (egress AR 60) which communicates with a destination MN 20 which must know about the IPha of the source MN 10, based on the routing address of the source MN 10. To do this, the destination AR 60 sends a query about the IPha of the source MN10 to an LRM 210 responsible for the destination AR 60. We call such a query "reverse query". Note that not only FIG. 4 but also FIGS. 5 and 6 described later refer to a "reverse query".

Reverse query is initiated when data packets sent from the source MN with IPra associated with IPha arrives at the destination AR. Since the original sender of the received data packet is a source MN, the destination AR must know about the IPha of the source MN. Thus, the reverse query is triggered by the arrival of data packets from the network, and it is initiated to obtain the IPha of the source MN. This is the reason why the reverse query is needed.

To perform "reverse" queries, that is to give the $IP^2$ terminal identifier (IPha) for a routing address, each LRM advertises the block of IP addresses allocated to the ARs it handles as pools of routing address. Moreover, the LRM also advertises the routing address blocks assigned to all ANRs (Anchor Routers not shown) in its discretion (including all other routers that may perform source address switching). This information is also distributed among RMs similar to the $IP^2$ terminal identifier blocks of HRMs creating a second "routing database" that contains entries toward (potential) routing addresses.

The destination AR (wishing to perform reverse source address switching) sends a reverse query to its LRM with the routing address in question. The query passes through the chain of RMs toward the LRM advertising the routing address. Similar to Option #2 as described above, it may skip some RMs along the way. According to an example of FIG. 4, the egress AR 60 sends a query about the IPha of the source MN10 to the LRM 210, the query passes through an LRM 220, LRM 230, LRM 240 and LRM 250, before it reaches LRM 260 communicating with the ingress AR 30 which knows about the IPha and IPra of the source MN 10.

When the query reaches the LRM advertising it (e.g. the LRM 20 in FIG. 4), the LRM responds with the corresponding $IP^2$ terminal identifier (IPha) either to (one of) the previous RM(s) on the path or directly to the originating AR (e.g. the AR in FIG. 4) or its LRM (e.g. the LRM 210). If the response was sent to an RM then that RM will further send the response backward toward the originating AR. The message will eventually reach that AR that can perform the reverse address switching.

Figure 5:
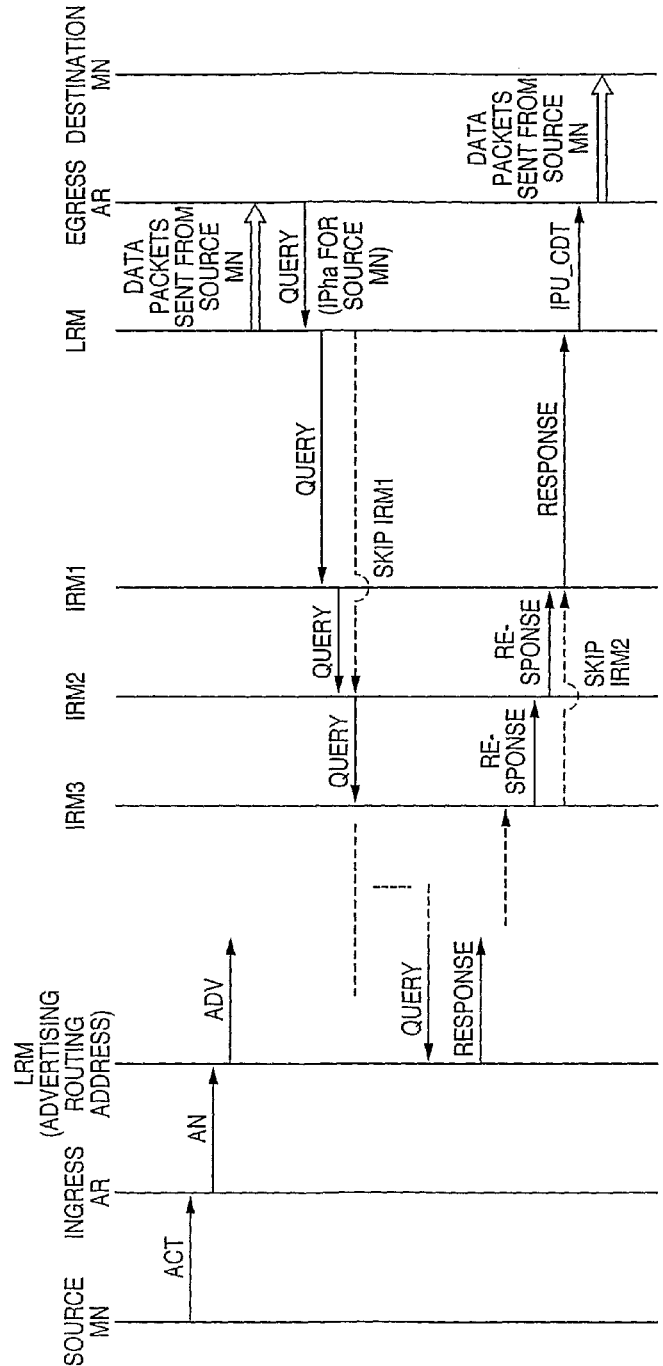
FIG. 5 is a communication sequence for notifying IPha of a source MN of a destination access router.

The above communication sequence is summarized in FIG. 5.

FIG. 5 is a communication sequence for an initial query-response of a destination access router.

The LRM advertising the routing address of the source MN may be a HRM if the ingress AR has already reported about the IPha and IPra of the source MN to the HRM. Note that, although FIG. 5 shows that the LRM responds to the activation signal (ACT) from the source MN, the LRM takes the initiative to send advertisement for all the IPha space handled by the ARs and ANRs.

As apparent from the above, all reverse queries reach the final LRM as opposed to queries for a routing address of a destination MN, where caching allowed the query to be responded by an RM other than the final HRM. We note however, that caching and/or subscriptions are also possible in the same way as described before.

Figure 6:
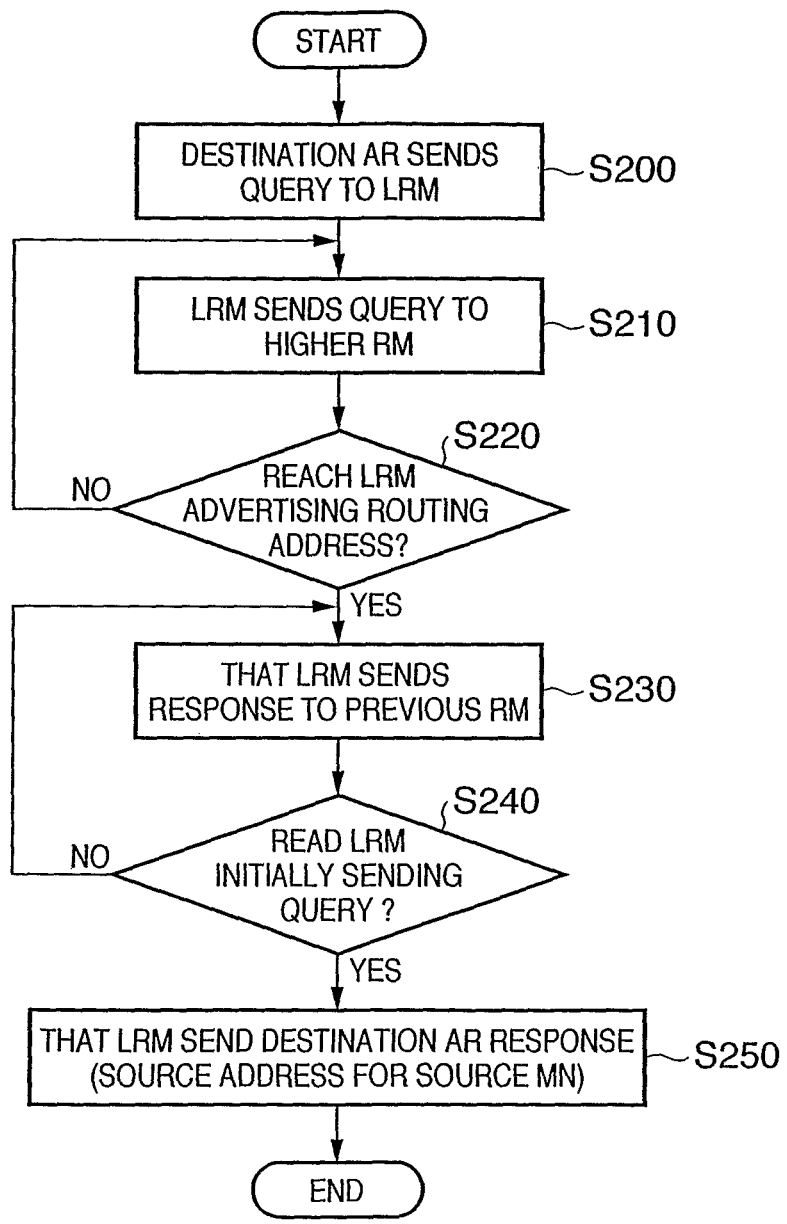
FIG. 6 is a flowchart showing the process of IPha notification.
Figure 7:
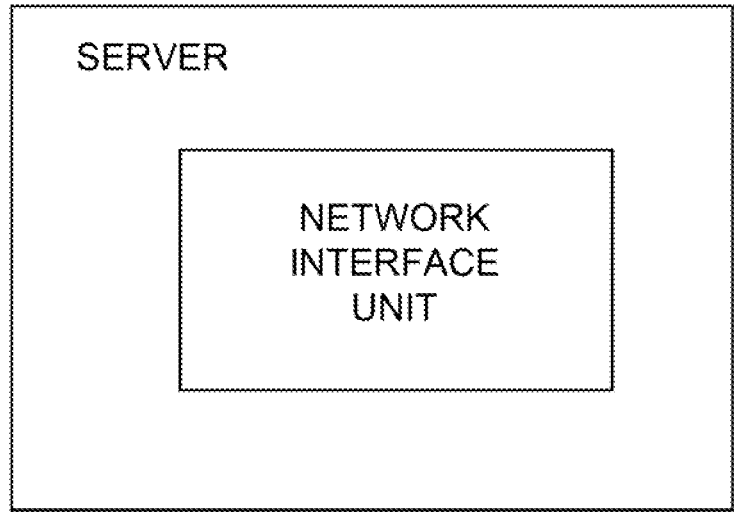
FIG. 7 is a block diagram of a server.
Figure 8:
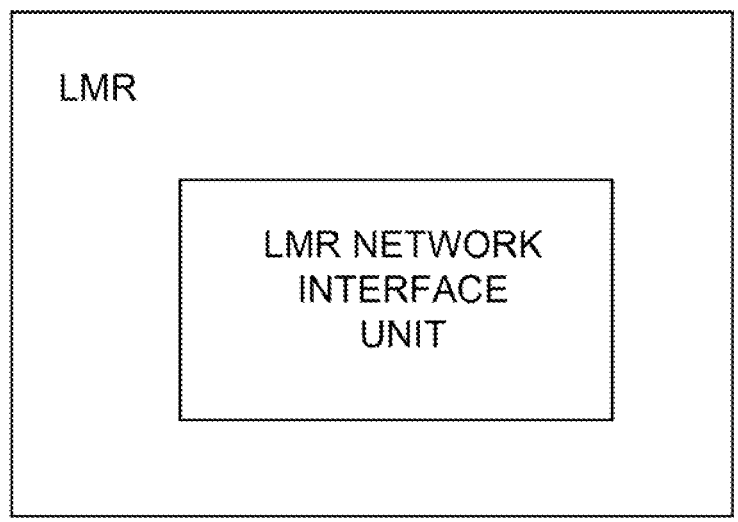
FIG. 8 is a block diagram of an LRM.

FIG. 6 is a flowchart showing the process of IPha notification.

At step S200, a destination AR sends a query about the IPha of the source MN, based on the routing address of the ingress AR to a LRM when data packets arrives at the destination AR.

In response to the query, the LRM sends (relays) the query to another LRM (IRM) at step S210.

Next, it is determined at step S220 whether or not the query reaches an LRM advertising the routing address. If "yes", the process proceeds to step S230. If "no", the process proceeds to step S210 to further relay the query.

At step S230, that LRM sends a response including the IPha of the source MN to a previous LRM (IRM). Then, it is determined at step S240 whether or not the response reaches the LRM initially sending the query address. If "yes", the process proceeds to step S240. If "no", the process proceeds to step S230 to further relay the response.

Finally, at step S250, the LRM initially sending the query address sends the response to the destination AR. The destination AR, then, sends data packets sent from the source MN, to the destination MN.

Thus, according to the embodiment as described above, once an ingress AR obtains an routing address (IPra) of a destination mobile node and an-egress AR obtains a source mobile node's identifier (IPha), the ingress AR sends packets to the egress AR without, using an HRM.

Further, according to the above-described embodiment, since specially formatted IP packets are not used, and the source and destination mobile nodes do not know anything about the routing address and other location information, internal information for routing packets are secured.

Furthermore, according to the above-described embodiment, since an HRM do not need to know all MNs information for routing management, and an IRM takes over such a role, overload for the HRM can be avoided, thus resulting in balancing load over the system.

Note that although the system in the above embodiment includes a single HRM, the number of HRMs can be more than one.

As many apparently widely different embodiments of the present invention can be made without departing from the spirit and scope thereof, it is to be understood that the invention is not limited to the specific embodiments thereof except as defined in the appended claims.

The invention claimed is:

1. A method of mobility management in an IP-based network system that includes a plurality of routers and a plurality of servers, including a home routing manager (HRM) and local routing managers (LRM) for individual mobile nodes, the method comprising the steps of;
   sending from an LRM a first query about a routing address of a destination mobile node toward the HRM, the sending of the first query being based on an activation notification (AN) from an ingress access router (AR) of the plurality of routers, the AR being triggered by a source mobile node;
   relaying the first query via a first path, including one or more LRMs acting as intermediate routing managers (IRM) closer to the HRM until the first query reaches the HRM;
   in response to the first query, the HRM sending the routing address of the destination mobile node back to the ingress access router along the first path;
   sending from an egress access router having the routing address a second query about a home address of the source mobile node to an LRM which performs mobility management for that egress access router;
   relaying the second query via a second path including one or more LRMs acting as intermediate routing managers (IRM) until the second query reaches an LRM advertising a routing address of the ,Source mobile node without passing through the HRM unless the home address of the source mobile node has been reported to the HRM; and
   in response to the second query, the LRM advertising the routing address of the source mobile node by sending the home address of the source mobile node back to the egress access router along the second path.

2. The method according to claim 1, further comprising the step of:
   sending an activation signal (ACT) to the ingress access router from the source mobile node; and wherein the sending of the first query being based on the activation notification can include the step of:
   sending the activation notification (AN) from the ingress access router, based on the activation signal.

3. The method according to claim 2, further comprising the steps of:
   determining whether each IRM has more than one path toward the HRM;
   selecting a path to the HRM, based on the determining result; and
   relaying the first query using the selected path.

4. The method according to claim 2, further comprising the step of providing a first database containing information on one or more adjacent routing managers closer to the HRM with each of the IRMs and LRMs, wherein
   the step of relaying the first query is performed based on the information contained in the first database.

5. The method according to claim 4, further comprising the step of:
   selecting a path to the IRM receiving the activation notification, based on the information contained in the first database,
   wherein the step of sending the routing address of the destination mobile node back to the ingress access router is performed through the selected path.

6. The method according to claim 5, further comprising the step of updating the routing address of the destination node through the selected path.

7. The method according to claim 4, further comprising the steps of:
   sending another activation signal (ACT) to a new ingress access router from the source mobile node when the source mobile node moves away from the ingress access router;
   sending an activation notification (AN) from the new ingress access router, based on the activation signal;
   sending a third query about the routing address of the destination mobile node, based on an activation notification (AN) from an LRM receiving the activation notification from the new ingress access router;
   relaying the third query via a third path including one or more LRMs acting as intermediate routing managers (IRM) closer to the HRM until the third query reaches a first routing manager that is aware of the routing address of the destination mobile node; and
   in response to the third query, sending the routing address of the destination mobile node back to the new ingress access router through the relay path from the first routing manager.

8. The method according to claim 1, further comprising the step of providing a second database containing information on routing managers toward the LRM advertising the routing address of the source mobile node with each of the routing managers, wherein
   said step of relaying the second query is performed based on the information contained in the second database.

9. The method according to claim 1, wherein a server acting as the LRM receiving the activation notification and a server acting as one of the IRMs are situated adjacent to each other.

10. The method according to claim 1, wherein some of the plurality of routers function as access routers, by wirelessly communicating with a mobile node.

11. An IP-based network system comprising:

a plurality of routers and a plurality of servers, including a home routing manager (HRM) and local routing managers (LRMs) for individual mobile nodes, wherein each of the LRMs comprises:

an LRM network interface unit for sending a first query about a routing address of a destination mobile node toward the HRM, based on an activation notification (AN) from an ingress access router (AR) of the plurality of routers, the AR being triggered by a source mobile node, and the HRM comprising means for sending the routing address of the destination mobile node back to the ingress access router in response to the first query, wherein one of the plurality of servers acts as an intermediate routing manager, said intermediate routing manager comprising:

the intermediate routing manager network interface unit relaying the first query toward the HRM;

the intermediate routing manager network interface unit relaying the routing address of the destination node toward the ingress access router;

the intermediate routing manager network interface unit relaying a second query, originated from an LRM which performs mobility management on an egress access router, having the routing address, about a home address of the source mobile node toward all LRM advertising a routing address of the source mobile node without passing through the HRM unless the home address of the source mobile node has been reported to the HRM; and the intermediate routing manager network interface unit relaying the home address of the source mobile node, as a response to the second query, originated from the LRM advertising the routing address of the source mobile node, toward the egress access router.

12. In an IP-based network system, a server comprising:

a network interface unit for relaying a query about a routing address of a destination mobile node originated from an activation notification, and from an ingress access router (AR) in the network system toward a home routing manager (HRM);

the network interface unit for relaying the routing address of the destination node toward the ingress access router as a response to the query;

the network interface unit for relaying a second query originating from a local routing manager (LRM) which performs mobility management on an egress access router (AR), having the routing address, about a home address of a source mobile node toward a local routing manager (LRM) advertising a routing address of the source mobile node without passing through the HRM unless the home address of the source mobile node has been reported to the HRM; and the network interface unit for relaying the home address of the source mobile node, as a response to the second query, originated from the LRM advertising the routing address of the source mobile node, toward the egress access router.

* * * * *

UNITED STATES PATENT AND TRADEMARK OFFICE
CERTIFICATE OF CORRECTION

| | | |
|---|---|---|
| PATENT NO. | : 8,526,434 B2 | Page 1 of 1 |
| APPLICATION NO. | : 12/376923 | |
| DATED | : September 3, 2013 | |
| INVENTOR(S) | : Valko et al. | |

It is certified that error appears in the above-identified patent and that said Letters Patent is hereby corrected as shown below:

On the Title Page, Item (76), under "Inventors", in Column 1, Line 2, delete "Szentendra" and insert -- Szentendre --, therefor.

In the Specification:

In Column 2, Line 43, delete "the," and insert -- the --, therefor.

In Column 3, Line 20, delete "address," and insert -- address --, therefor.

In Column 5, Line 9, delete "the," and insert -- the --, therefor.

In Column 6, Line 48, delete "router; and" and insert -- router; --, therefor.

In Column 6, Line 51, delete "server;" and insert -- server; and --, therefor.

In Column 6, Line 59, delete "In," and insert -- In --, therefor.

In Column 9, Line 2, delete "to," and insert -- to --, therefor.

In Column 9, Line 25, delete "routing," and insert -- routing --, therefor.

In Column 12, Line 38, delete "LRM 20" and insert -- LRM 260 --, therefor.

In the Claims:

In Column 13, Line 67, in Claim 1, delete ",Source" and insert -- source --, therefor.

Signed and Sealed this
Eleventh Day of February, 2014

Michelle K. Lee
*Deputy Director of the United States Patent and Trademark Office*